US008126780B2

(12) United States Patent  
Iwai et al.

(10) Patent No.: US 8,126,780 B2
(45) Date of Patent: Feb. 28, 2012

(54) METHOD FOR CULTURED SEA ALGAE

(76) Inventors: Katsumi Iwai, Tokyo (JP); Hiroshi Horibata, Tokyo (JP)

( * ) Notice: Subject to any disclaimer, the term of this patent is extended or adjusted under 35 U.S.C. 154(b) by 1092 days.

(21) Appl. No.: 12/005,012

(22) Filed: Dec. 24, 2007

(65) Prior Publication Data

US 2008/0228542 A1 Sep. 18, 2008

(30) Foreign Application Priority Data

Dec. 26, 2006 (JP) ................................. 2006-357463
Jan. 17, 2007 (JP) ................................. 2007-008282

(51) Int. Cl.
*G06Q 30/00* (2006.01)
*G06F 17/30* (2006.01)
(52) U.S. Cl. ................. 705/26.1; 705/26.25; 705/26.35; 705/37; 705/308; 41/1.4; 588/249; 588/251
(58) Field of Classification Search ........ 705/26.1–27.2, 705/37, 308; 47/1.4; 588/249, 259
See application file for complete search history.

(56) References Cited

U.S. PATENT DOCUMENTS

| 5,309,672 | A * | 5/1994 | Spencer et al. | 47/1.4 |
| 5,467,271 | A * | 11/1995 | Abel et al. | 702/5 |
| 5,820,759 | A * | 10/1998 | Stewart et al. | 210/602 |
| 6,037,170 | A * | 3/2000 | Sekine | 435/292.1 |
| 6,212,824 | B1 * | 4/2001 | Orr et al. | 47/58.1 R |
| 6,567,537 | B1 * | 5/2003 | Anderson | 382/110 |
| 7,617,057 | B2 * | 11/2009 | May et al. | 702/62 |
| 7,803,601 | B2 * | 9/2010 | Nobles, Jr. et al. | 435/252.3 |
| 7,966,250 | B2 * | 6/2011 | Constantz et al. | 705/37 |
| 2003/0089803 | A1 * | 5/2003 | Huntley | 239/542 |
| 2006/0207168 | A1 * | 9/2006 | Harper | 47/1.4 |
| 2007/0266623 | A1 * | 11/2007 | Paoluccio | 44/629 |
| 2008/0270272 | A1 * | 10/2008 | Branscomb | 705/30 |
| 2009/0113790 | A1 * | 5/2009 | Erd | 47/1.4 |
| 2009/0126265 | A1 * | 5/2009 | Rasmussen et al. | 47/1.4 |
| 2011/0003345 | A1 * | 1/2011 | Nobles et al. | 435/100 |

FOREIGN PATENT DOCUMENTS

| GB | 2453194 A * | 4/2009 |
| JP | HEI5-308871 | 11/1993 |
| JP | 0531689 A2 | 12/1993 |
| JP | HEI5-316891 | 12/1993 |
| JP | HEI1-79876 | 3/1999 |
| JP | 2000-32963 | 2/2000 |
| JP | 3587715 | 9/2000 |
| JP | 2004-166513 | 6/2004 |
| JP | 2005-129088 | 5/2005 |

(Continued)

OTHER PUBLICATIONS

GreenShift Acquires Rights to Patented Carbon Dioxide Reduction Technology; New Strain of Thermophilic Cyanobacteria Converts Exhaust Carbon Dioxide Into Pure Oxygen and Clean Water Anonymous Business Wire, p. 1, Dec. 12, 2005.*

(Continued)

*Primary Examiner* — Will Allen

(57) ABSTRACT

A method and apparatus for utilizing, processing, distributing and an accompanying business model for sea algae, particularly forced cultured kombu, to prevent the expansion of global warming, by encouraging a re-purchase of the cultured sea algae, by paying the purchaser back, in a constant rate, a part of the profit from the sales of a CO2 omission right, which right depends upon the CO2 absorption and fixation ability.

23 Claims, 5 Drawing Sheets

FOREIGN PATENT DOCUMENTS

JP        2008-197836        8/2008

OTHER PUBLICATIONS

Going for green: reducing emissions shouldn't be a burden for firms. Ruth Prickett explains how a green gameplan can create savings and opportunities.(The Green Gameplan in association with the Carbon Trust) Prickett, Ruth, Financial Management (UK), p. 26(4). Oct. 2008.*

Chap. 1 and 2 of "Culture in Kelp (*Laminaria japonica*) in China", available on-line at http://www.fao.org/docrep/field/003/AB724E/AB724E01.htm http://www.fao.org/docrep/field/003/AB724E/AB724E02.htm.

Fuji Sankei Business Eye Newspaper, Tokyo Gas Co., Ltd Succeeded Generating Electricity from Sea-Weed, Jun. 10, 2006.

Laboratory; email: atakeda@mail.eccu-tokyo.ac.jp; laboratory: http://fol.fs.a.u-tokyo.ac/jp; Jul. 4, 2007.

* cited by examiner

Sahara type large mooring facility (carbon fixture quantity)

Trunk lope 1,200m x 23 lines

Culturing rope 8m x 1,200m x 22 = 212,000m

Water depth 25m

Wet weight kombu(yield) 20kg x 212,000 x 22 = 4,224 tons

Dry weight kombu = 845 tons

Carbon fixture quantity = 422 tons

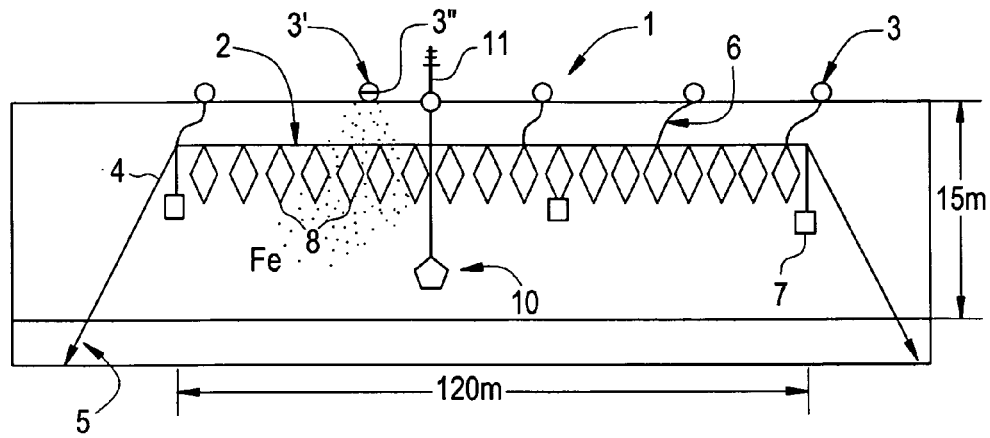
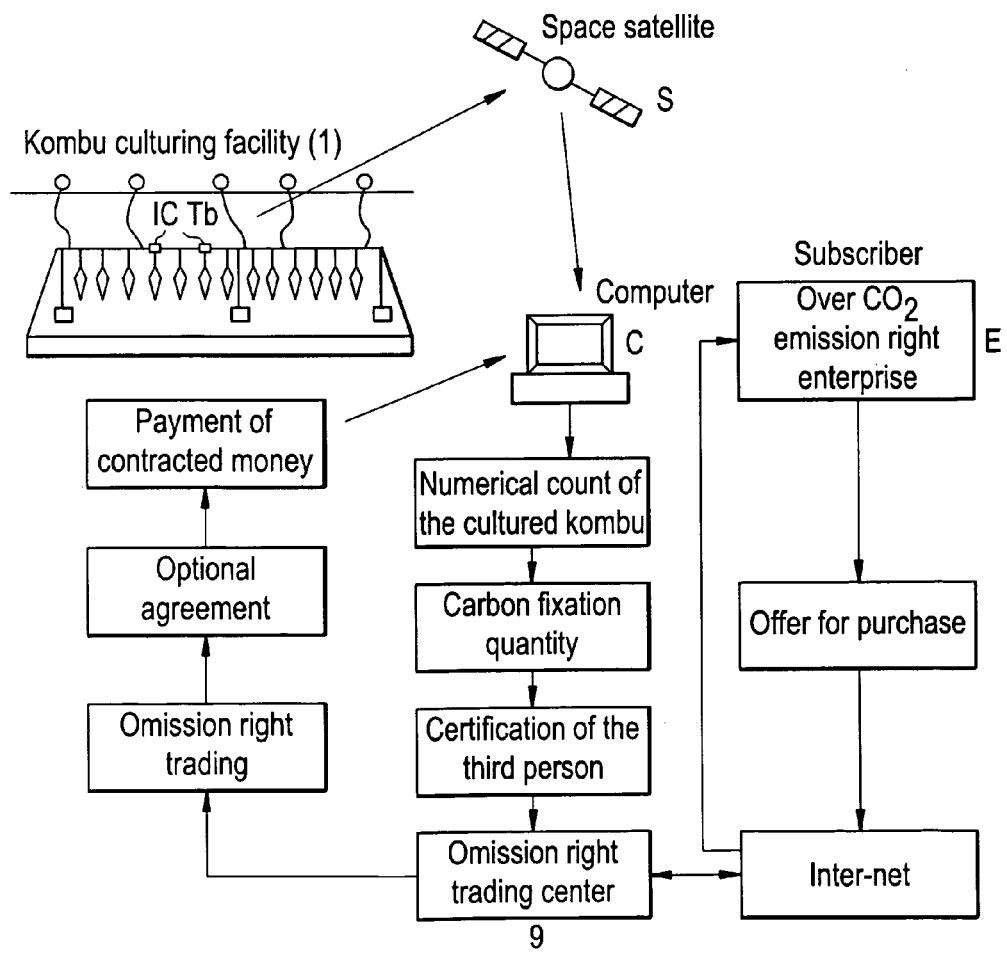

METHOD FOR CULTURED SEA ALGAE

CROSS-REFERENCE TO RELATED APPLICATIONS

This application claims the benefit of priorities under 35 USC 119 (a)-(d) to Japanese Patent Application No. 2006-357463 filed Dec. 26, 2006, and Japanese Utility Model Application No. 2007-8282 filed Sep. 28, 2007, the contents of both which is hereby incorporated by reference.

BACKGROUND OF THE INVENTION

This invention relates to a business model for the cultured sea algae, especially cultured kombu.

The exhausting of a great deal of Green House Gases (GHG) such as carbon dioxide, methane, di-nitrogen monoxide, and fluorocarbon gas etc., due to mass usage of fossil fuel which provides good combustion efficiency and to rapid industrial growth of this country after World War II; excessive deforesting, particularly the disappearance of tropical rain forests for food increase production as a result of to remarkable population increase; and desertification of the meadow for excessive pasturing; the natural environmental reproduction ability of the earth has weakened remarkably to cause abnormal weather successively, owing to rapidly progressed global warming and those phenomenon are further accelerating the weakening.

On the other hand many kinds of the living things, plants and minerals, which cannot be compared with them on the land, have existed in the ocean where also ⅔ of the earth are occupied. However, a part of the living things and the plants begin to dry up, due to multiple influence of destruction of the coast environment by recent rapidly industrialization, indiscriminate fishing of the resource and above ruin of the land, and at last the natural environment of the entire earth begins to suffer those influences also.

In studying those situations, it can be concluded that the greatest cause of such ruin is the "GHG" such as carbon dioxide, methane, etc., which promotes the above mentioned global warming. An international agreement has been adopted in Kyoto, Japan, known as the Kyoto Protocol, for the reduction of the exhausted amount or for increase in the absorbed amount of the above mentioned gases. The principal points of the Protocol are as follows:

1. Each advanced country sets a legally binding numerical target for the amount of green house gas exhaust in the advanced country.
2. To reach above object internationally and cooperatively, mechanisms such as a discharge gas business, clean development mechanism and Joint Enforcement (JE) etc., are introduced.
3. A new obligation of a numerical target is not introduced for the developing country.
4. The objectionable gases are assumed to be carbon dioxide, methane, di-nitrogen monoxide, HFC, PEC, SF6, etc.
5. The absorption source is a forest absorption source and that amount is counted in the amount of GHG absorption.
6. The base year of the agreement is 1990, however, the base year for HRC, PFC and SF6 may be 1996 respectively.
7. The target period is assumed to be 2012 from 2000.

The target of reduction rate for the objectionable gas per each advanced country is 7% in Japan, 7% in U.S.A, 8% in EU, and at least 5% in the entire advanced countries Accordingly, the country or the enterprise which exhausts the GHG voluminously, by the mutual agreement of such each country, causes an obligation to perform each allocated and targeted reduction, however, if they cannot reach each reduction rate of the gas, they have to buy the gas from a country or an enterprise which is able to supply the amount, and to make up such a shortage. Moreover, the mechanism such that the reduced amount can be sold off to another country or enterprise, when the amount can be reduced below the target by developing an excellent carbon fixture technology etc., can be created in this field, and a huge market to buy and sell the carbon dioxide omission right can be performed hereto also.

In another way, an accurate verification of the abatement of emission of such GHG can be done comparative easily and accurately in the secondary industry manufacturing sites such as a power generating, fuel gas manufacturing and steel manufacturing industry, etc. by a precise measuring instrument, etc. However, there are presently no accurate measuring method for the accurate verification on the carbon fixing amount on the forest, ocean and sea algae, and still no standard method to do it, except for a hypothesis or doctrine.

The value of money evaluation for multiple function of the forest industry is presently evaluated as ¥70,763,800,000,000,000 and the value of the carbon dioxide absorption of those is assumed as in the amount of ¥1,239,100,000.000. However, the absorption rate of the ocean is considered to be zero. Such conclusion seems to be basing upon the hypothesis of Daus announced in 1981 because there has been no method to verify the trusted carbon dioxide absorption, in that time. Contrary, Long Hearst has announced on 1998 that the numerical value of the carbon dioxide absorption on the ocean having a high reliability, as 45-51 billion tons/year, which has been analyzed from a value, basing upon a scientific investigation of space satellite. Recently, two or three researchers have announced that the annual CO2 absorption rate per square meter of the sea algae such as *sargassum fulvellum*, and forcing cultured kombu, etc., is twice or more of the tropical forest, as follows:

| Absorption Source: | Tropical rain forest | Temperate zone deciduous tree | Sea algae and *Sargassum fulvellum* (A) | Sea algae and forced cultured sea weed (B) |
|---|---|---|---|---|
| Annual Absorption: | 150-1200 gr/m/year | 1200 gr/m/year | 4100 gr/m/year | 4800 gr/m/year |

(In those reports, (A) theory, depend on Prof. Kazuya Taniguchi, Tohoku University, (B) theory, Guest Prof. Kazuo Sakai, Kagoshima University)

(In those reports, (A) theory, depend on Prof. Kazuya Taniguchi, Tohoku University, (B) theory, Guest Prof. Kazuo Sakai, Kagoshima University)

By those doctrines, there have occurred presently from everywhere that the old opinions such that the CO2 absorbing activity source in nature is merely in the forest, has to review so as to pay attention on the absorption of the sea algae also, and to review the first production capacity and the CO2 absorption power of the coast sea algae especially the forced cultured kombu, because the above numerical values have been obtained by using a space satellite having highest scientific reliability. Additionally, the bay and offing culture methods of kombu and wakame, have been continuously and remarkably improved and developed on their technologies and facilities and a large quantity of planed and to freely control to cultivate them presently, while, the calculation of the great volume of such intentional planed production so leads from a highly precise measuring method of the space satellite that the calculation of the volume is extremely reliable, and some opinions that the calculation, repot and inspection led through of the method of the space satellite should be recognized as a GHG omission source, corresponding to it by the ISO14064 system, began to occur consequently.

From such time, a business model of the GHG omission trading for immobilization of CO2 gas into the ocean, deep water and sea algae, began to be suggested as a material project or a mega enterprise project recently, and some of them have been disclosed in some patent documents. For example, Japanese Patent No. 3.587.715 discloses a business system where (1); the deep sea water is drawn up by electric power generated with sun light or wind power to scatter it into the air; (2) CO2 gas in the air is absorbed into the scattered deep water and taken into the water; (3) the quantity of the CO2 gas in the under water is calculated to request the third person certification; and (4) the calculated quantity after the certification, is sold as the quantity of CO2 omission.

Additionally, Japanese Patent Publication No. 2005-129088 discloses also another business model characterized in that such fixed quantity of carbon dioxide obtained especially from: an activation technology of the carbon dioxide fixing ability of the shore, a fixing technology of carbon dioxide of the coral by bring up the coral reef, (a same technology by constructing the breeding ground of the bivalve), by building the sea algae breeding ground, and also by vegetating for luxuriant growth of the mangrove; is measured accurately to calculate it for management in a computer and the each calculated quantity with the above each technology is demanded a public third party to their certification for obtaining a carbon dioxide omission right and the right is sold under a security of the public certification through an electric communication circuit, for a nation or an environmental load type enterprise, which is requesting to buy it, after the certification.

| Patent document 1 | Patent No. 3,587,716 |
| Patent document 2 | Patent Kokai Publication No. 2005-129088 |

BRIEF DESCRIPTION OF THE DISCLOSED INVENTION

Accordingly, an embodiment of the present invention provides a business model especially for a nation, a mega enterprise or a company community, in which it relates to a trading of the CO2 omission right created with a sea algae in the ocean, especially forcing cultured kombu, the various secondary products of the cultured kombu material and the technologies, machines, facilities, etc., for producing or processing those raw materials or products.

However, the greatest problem for solution of such object is at a point how to measure preciously the fixed or reduced GHG gas for exact calculation, and how to fairly certify it for proper settlement. In such opinions, presently, adaptation of the international standard ISO 14064, which is used for calculation, report and certification of the amount of the GHG omission is merely limited to the forest wood, and the ocean and sea plants which are difficult to calculate the GHG omission rate of their objective individual, have not been adapted such discharge reduction source, as mentioned above.

Against such reality, the broadness of marine, the speed of growth of the sea algae, and their amount of GHG absorption (fixation) per unit capacity, as shown in a table of above Long Hearst analysis, is respectively an incomparable value to the forest wood, and the accuracy of the remote sensing by a space satellite, has been so improved remarkably that a surge of the movement of tendency for participation into the GHG omission right market rushes for the sea algae culture business and it has been impossible to be ignored actually.

Especially, the plan productive sea algae culture business (ALGA) which can more easily evaluate its fruits than the forest wood, is reasonable only one primary industry that CO2 gas fixture can be remarkably and artificially increased, expect for the forest wood. Accordingly, a business model created for the sea algae culture industry, which provides a very highly market evaluation, began to come into a limelight unexpectedly for industrialization of "JE" (Joint Enforcement) of the advanced country and "CDM" (Clean Developing Mechanism) of the developing country, which utilize the Kyoto Protocol, according to a market mechanism for accomplishment of an aim of the CO2 omission.

However, as mentioned before, there is a greatest problem, how they can obtain a third person certification, which makes a definite promise on the accuracy, reliability, transparency, etc., for obtaining the GHG omission right, in the ocean primary industry, due to coming into such GHG omission right market. Therefore, the technologies and phenomenon described in Japanese Patent No. 3,587,715 and Japanese Patent Publication No. 2005-129088 seem to be difficult to get above certification because they are not definitely on the GHG omission in or on the ocean, respectively.

Namely, a business model disclosed in Japanese Patent No. 3,587,715 relates to a system comprising the deep sea water is drawn up by using an electric power generated by sun light or wind force to scatter it into the air for absorption of its atmospheric carbon dioxide and the carbon dioxide absorbed in the water is taken into the under sea to reduce the atmospheric carbon dioxide. However, it seems that the accurate numerical value obtained from such system can not be reliable to guarantee because its absorption rate of carbon dioxide is remarkably influenced by natural phenomenon evidently, and further calculation and decision of its absorption rate in to the ocean, which is very broadly and changing violently, is also very difficult.

In a business model described in Japanese Patent Publication No. 2005-129088, its CO2 absorbing source is also defined as a natural coral reef, a bivalve, a breeding ground where sea algae is easily to propagate, or a thick grow ground of mangrove, however, their carbon dioxide omission right calculated and decided by the computer is guessed that they are also very ambiguous and unreliable respectively because each absorbed quantity of those objects is clearly affected by each bring up place, the kind of absorption individual, the natural condition, or the facilities for planting, etc. Accordingly, an embodiment of the present invention provides a novel and useful business model characterized that its objective individual is on a group of the brown algae, *Rodophyta Chlorophyceae*, especially the cultured kombu, which can be easily control artificially and internationally its cultivation, and can create to trade the carbon dioxide omission right, various industrial products made from such cultured kombu material, their production technologies or equipments.

Due to an improvement of difficulty for getting the public certification of the CO2 omission right on the ocean, especially, the natural sea algae, the present invention intends to use, as a means of the GHG omission which is the urgent need of the earth, the force cultivated sea algae, especially the force cultured kombu, which provides various merits, such as the forced cultivation being easily, speedy, and intentionally; its various measurements being easily; it providing many useful components for the mankind; and further being high carbon dioxide fix ability; and at same time, to provide with a business model for trading the cultured kombu material itself and its primary, secondary industrial products which can be utilized usefully and multiply, as mentioned before.

Accordingly, an embodiment of the present invention solves the above problems with a kombu culturing facility of a predetermined scale which can easily and intentionally produce the kombu and easily measure it physically and chemically, is constructed in the coast, the bay or the offing, the kombu is cultivated in the under sea for 4 to 6 meters, according to a prior culture technology after kombu spore is incubated on a cultivating rope, and growth of the kombu stock for above term is researched precisely and continuously by means of the hyperspace measurement method comprising a space satellite remote sensing, an under water remote sensing and an artificial direct sensing, etc., to storage in a specific computer as a survey value, and thereafter the crop of such cultivation is secured in comparison with said survey value stored in the computer and a value of corresponding factor on the dater base of the kombu culture technology inputted Into the computer, and finally the $CO_2$ fixture value is calculated to agree with optionally an environmental load type enterprise or the same type country to sell it, after yielding a public third person certification of it as the $CO_2$ omission right exchange.

In an embodiment of the present invention the business model of the cultured kombu includes also a same model of methane gas for the fossil fuel, produced by a fermentation bacteria from the harvested low quality cultured kombu and the disposal kombu. The methane gas is much expected its usage in future, together with bio ethanol, as a clean bio fuel for a limited fossil fuel, because its reduction also is guaranteed an advantage of the omission right as same as the carbon dioxide for it is the GHG prescribed in Kyoto agreement and is also more easily produced with bacteria from the sea algae providing huge production ability.

While, in such business model, in an embodiment of the present invention a part of the profits obtained from the $CO_2$ and $NH_3$ omission right is saved in a constant rate and a predetermined money corresponding to the purchase volume of the cultured kombu to use as the insensitive fund for activation of the same market.

Furthermore, in an embodiment of the present invention the manufacture and sales business for the food (1), the industrial product (2), the beauty article and beauty treatment salon article (3), the agriculture, forestry and fisheries article (4), etc., is respectively created from the cultured kombu material, and the offer business for the culture technology and culture facility, and the sales and offer business for sea algae production technology, accompanying with the above businesses too.

In an embodiment of the present invention each data of such created culture kombu business model including the culture kombu using or manufacturing business, but excepting for the $CO_2$ omission business and the fermentation methane producing business, is charged into a same or different computer, and under a certain circumstance, a pass word and a code number for a customer are also registered there in, so that the customer is able to access easily the data base for the research of a predetermined data, through a communication circuit, and the object from the data bases sold or bought, after an optional agreement.

BRIEF DESCRIPTION OF THE DRAWINGS

The invention and embodiments thereof will be understood more clearly from the following description when read with the accompanying figures. These figures are given purely by way of an indication and in no way restrict the scope of the invention. Of these figures:

FIG. 4 is a structural drawing of the facility in FIG. 2;

FIG. 5 is a schematic of a cultured kombu business model under a computer management utilized a space satellite survey;

FIG. 7-B is a schematic showing a relation between the $CO_2$ omission right profit and the United Nations and;

DETAILED DESCRIPTION OF AN EMBODIMENT OF THE INVENTION

According to the above business model, a first effect of an embodiment of the present invention is in a selection of the sea algae especially the forcing cultured kombu which can grow up to several meters during only 4 to 6 months, as an objective individual of the present business model. The reasons of the above selection are in the facts that such cultured kombu can be easily mass produced intentionally; the calculation of the carbon dioxide omission right can be advantageously and precisely, because the kombu stocks on the trunk ropes and culture ropes in the under water are so calculated previously that their production volume is easily and accurately calculated; and such cultured kombu can also create various production and sales businesses, which provide an useful and inherent effect, as shown in FIG. 1, because its components much include various very important proteins, minerals, carbon hydrates, vitamins, etc.

Figure 1:
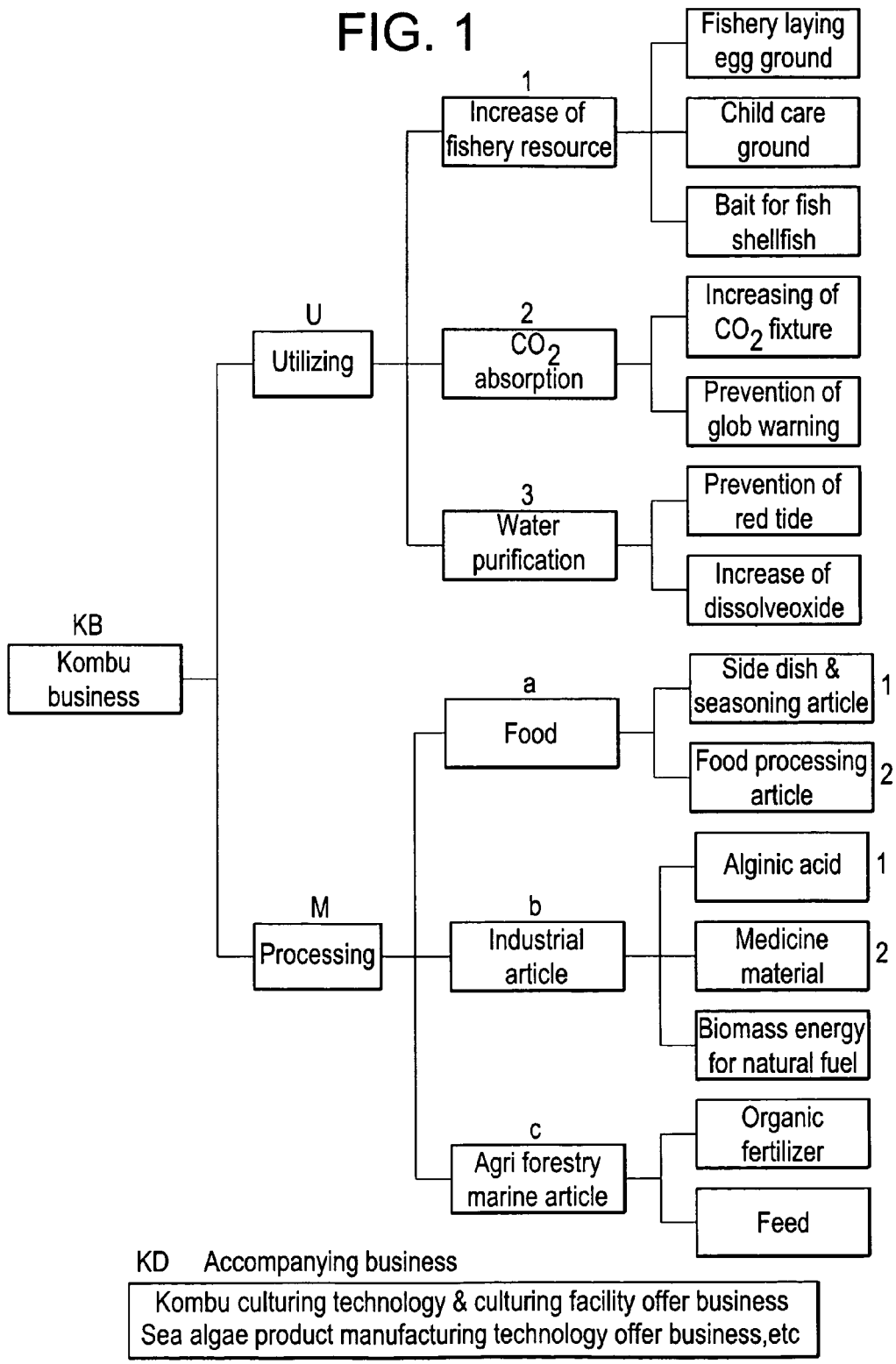
FIG. 1 is a flowchart for a forced cultured kombu business model of an embodiment of the present invention.

For example, firstly the cultured kombu business (u), as shown in FIG. 1, provides with immeasurable important effects, namely an Indirect business effect (1) in which the cultured kombu thickly grew under a culture facility provide with an increasing effect of the marine resources, comprising a part of laying egg ground for the adult fishes, an other part of child care ground for the childish fishes, and further part of diet for the fishes and shellfishes; a special profit of obtaining the $CO_2$ omission right, according to the above $CO_2$ absorption and fixture, namely a Direct business effect (2); and further the water purification effect an Indirect business effect (3); by oxygen discharged in photosynthesis of the cultured kombu. As the result of those profits and effects, it shows clearly that the cultured kombu is very useful for much increase of a catch of fish, prevention of global warming, purification of under sea environment, and many effects for sea sanitation, sea rest, and sea sight seeing respectively, and thereby, for improvement and activation of the regional economy.

Furthermore, it should be particularly noted that the object may enter into the GHG omission right trading according to the "Kyoto Protocol" and create its economical profit thereby. Such profit depends on an effect which is obtained with an intentional production of the sea algae especially the cultured kombu, which is in 4-5 time quantity of CO2 absorption rate by the forest, especially, the tropical rain forest, however, there is inconsistency such that the object has not been adapted presently as the CO2 absorption source in "Kyoto Protocol", even though Long Hearst analysis about the CO2 absorption quantity have been announced on 1995. While, a strong argument such that above inadequate problem for the CO2 omission right should be reviewed presently so that the absorption source of the ocean and under sea plants can be also handled as same as the forest wood, begins to appear recently because the observation value from a space satellite is very high precisely value yielded from marine chlorophyll measurement by means of a color sensor etc., put on it. Due to such reasons, the embodiments of the present invention are proposed as a business corresponding to ISO14064, for the cultured kombu business, under an assumption of a case of the ocean CO2 absorbing source, and the many effects described hereinbefore are also announced under such a assumption.

On the other hand, the profits obtained in the CO2 omission right trading are so considered that they are paid-backed for each kombu purchaser at a constant rate and in proportion of his purchasing quantity of the kombu, and may be used to lead further activation and magnification of the business, by cause of the paid-back money, more development and expansion of the cultured kombu industry may be expected evidently in future.

In the kombu processing business, it may be separated into the following three fields, namely, (1) a food stuff business in which the cultured kombu itself is used directly as the food stuff or the processing food stuff, (2) an industrial product article businesses including the alginic acid, medicine, beauty and healthy articles, beauty treatment salon article, supplement article and alternative energy for the fossil fuel such as methane, ethyl alcohol, etc., and (3) an agricultural, forestry, and marine industrial product business for the organic fertilizer and feed production, and they can respectively make many effective goods to produce and distribute advantageously in each field.

Moreover, the cultured kombu business makes the third accompany business, namely, a kombu culturing technology business; a kombu culture facility business, and a their offer business; a sea algae product manufacturing technology business and a their offer business; and especially the kombu culture facility business may easily change to a military defense facility business by providing detectors and/or electric or electro transmitters on a part of the facility, and to a large recycling facility, which can recycle a huge quantity of iron slag by scattering it into the under water through the floats or other means providing on or in the facility, with the fertilizers of the sea algae, as described herein after.

All the cultured kombu businesses including such third accompany business further drive additionally an employment business the labor to be employed in those businesses; a development business for their living spots, daily necessary shops, community systems, etc; and a kombu farm visiting or sight seeing business; and so on.

In a global aspect, the present cultured sea algae business model may also be utilized preferably to use for absorption and fixation of the GHG gas and production of the cultured sea algae in a territorial water sea area of another nation, for the above various purposes of a certain nation, especially an inland nation, by an international mutual credit agreement between the both nations, according to the Kyoto Protocol, and may give uniformly a huge profit including the GHG omission right from the cultured sear algae for those nations, due to such substituted and credited ocean.

As a result, the cultured sea algae business model may be expected a huge profit and effect which may stimulate strongly the economical activation of their regions, in spite of domestically or internationally, because they may induce the immeasurable economical ripple effects, as mentioned before.

FIG. 1 shows a system drawing of the cultured kombu business model of an embodiment of the present invention. In a practical enforcement of such broader cultured kombu business, there are some problems such as, where select a suitable region in which the kombu material can be well cultured intentionally and measurably to supply easily, and whether a suitable facility well adapted in such a region can be constructed easily or not, etc. However, three type facilities, such as a coast type culture facility constructed in the rias coast region of SANRIKU or MIE PREFECTURE, a bay type facility in an opened bay for example, MUTSU bay or SET-ONAIKAI (SET INLAND SEA), and an offing and up-down floating type, which can bear even to TYPHON in Hokkaido have already been constructed respectively in Japan, and some of them, further improved, so that the applicable depth under the water can reach up to 60 m, and the offing distance, up to 8000 m. Moreover, such technologies have been improved continuously up-today, and consequently they come to be guessed that such kombu culture can be freely done within the all sea areas, given an economical profit internationally, regardless such depth and offing distance, and their economical effects with the global warning reduction effect seem to be immeasurably, in future. Nevertheless, as a best mode of the present invention, a typical culture kombu Business model is illustrated hereunder, referring the records of the large offing type facility for the cultured kombu, showing in FIG. 2, constructed in the offing of SAHARA-MACHI, HOKKAIDO, however, it should be recognized that the sea algae cultured on such facility are not always limited to use the kombu but are usable also the similar sea algae such as the blown algae, *Rhodophyta, Chlorophyceae*, etc.

Figures 2, 3:
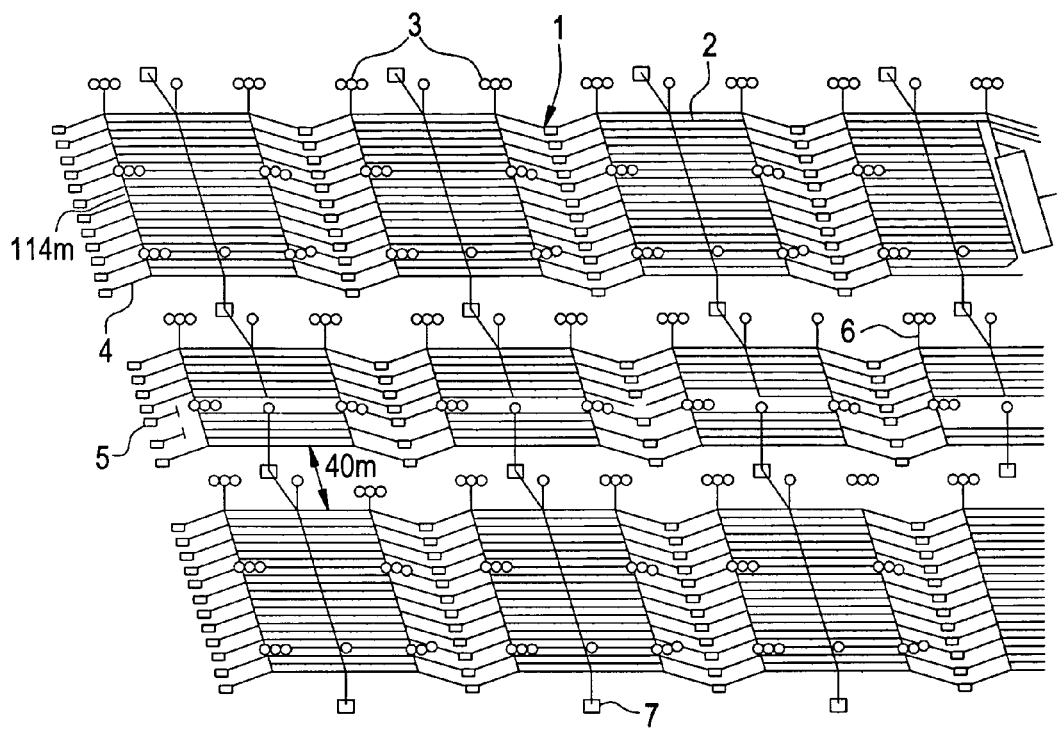
FIG. 2 is a schematic for a bay type large culture facility utilized for cultured kombu of an embodiment of the present invention.
FIG. 3 is a rough estimated table showing a relation between the material and size of the facility in FIG. 2 and quantity of the cultured kombu.

The large kombu culture facility (1) as shown in FIG. 2, is constructed at depth of 25 m in the offing of SAHARA-MACHI, HOKKAIDO, as a bay type facility, and is in a scale of 23 trunk ropes of 1200 m length and culturing ropes of 8 m×1200 m×22=211,200 m length, and its yield is generally calculated in a quantity of 4,224 tons per one facility. In such skilled in the art, the wet kombu in a weight of 4224 tons are regarded as corresponding to 845 tons of the dry kombu, and also a quantity of carbon fixation is estimated as a quantity of a half of the dray kombu weight, namely 422 tons. Accordingly, the amount of shipment of the industrial products yielded by one time kombu cultivation of this facility, is calculated with 1 million 4 yen×224=4224 millions yen, while the profit from the CO2 omission right, 5000 yen× 422=2.11 million yen, and the sales value of the goods from primary industry, 4224 millions yen+2.11 millions yen=4226.11 millions yen, in total. (Ref.; The calculation of the above CO2 fixture quantity depend on a simple measuring method of the quantity of carbon fixation presented by Professor K. Taniguchi; Tohoku University, and Guest Professor, Kazuo Sakai, Kagoshima University). Additionally, various records especially the wet weight of the cultured kombu obtained on the facility are quoted as a computer data base of the cultured kombu business model because they are direct surveys of the manufacturer and seem to be numerically correct and reliably, accordingly.

While, FIG. 4 shows a standard kombu culturing facility (1) which comprises a float (3), weight (7), adjusting rope (6), trunk rope (2), anchor rope (4), anchor (5) and cultured kombu (8). In such facility, firstly, a kombu seed rope on which the kombu spore were cultured properly after sown them on the rope, is held into or on a trunk rope (2) with an IC tab (Tb), and constructed in a proper region such as an inland bay, with the other culturing facility materials, and thereafter the cultured kombu on the rope is thinned properly to cultivated, shown in FIGS. 4 and 5.

The kombu (8) cultivated by such manners, are managed numerically to count numbers of the IC tabs attached with the kombu seed rope (not shown) on the trunk rope (2), through a space satellite (S) with the computer C, throughout its growth term, and their crops are extracted always for comparison with the records in the computer data base, to improve their culturing procedures and to control their growth. The cultured kombu finally are reviewed in the presence of a public third person after the measurement of three dimensional remote sensing so that the yield can be maintained its accuracy, transparency, and reliability. The kombu cultivator or distributor thereafter agrees with optionally the global warming load type enterprise or country for sales of such cultured kombu under a security of the public certification described hereinbefore, through a CO2 omission right trading center (9), and finally can receive the contract money through an ordinal or electro account in the commercial banks. The cultivator or distributor can also contract with, either a subscriber (E) registered previously in the CO2 omission right trading center (9) due to an over CO2 omission right enterprise, or a new buyer, located out from the information of the trading center, in the meanwhile. Of course, such cultured kombu itself or CO2 omission right may be distributed in an ordinary trading center under a prescribed certification. However, an internet distribution through a communication circuit from the trade center is very convenient and settlement for the omission right agreed optionally to the cultivator is also preferably done according to the electro money payment system.

Figure 6:
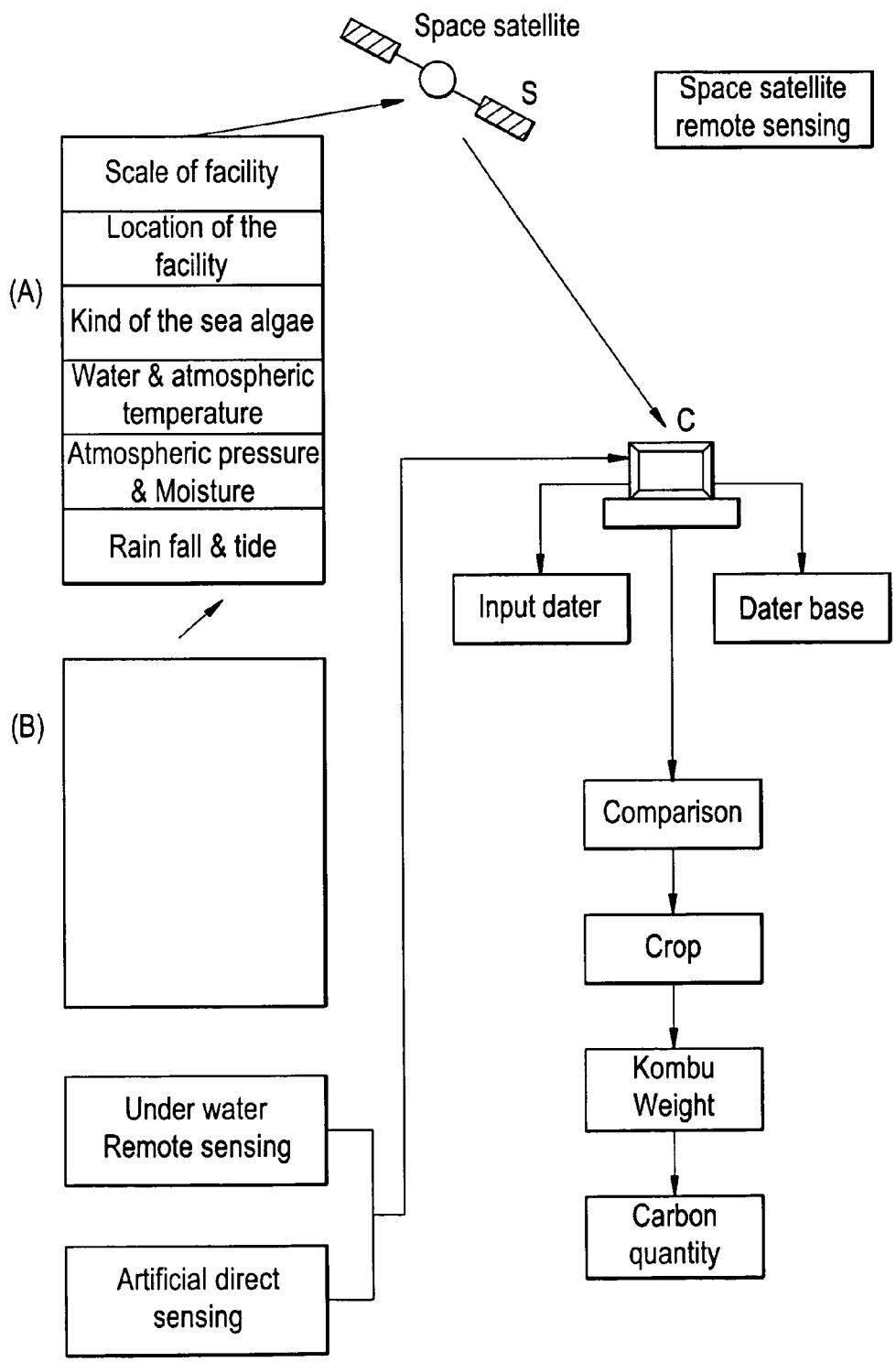
FIG. 6 is a flowchart of a $CO_2$ omission right calculation system under management of a computer, utilizing a three dimensional close survey system, such as a space satellite remote sensing, under water remote sensing, and artificial direct sensing.

While, FIG. 6 shows an embodiment of a minute calculation model for production volume of the cultured kombu, as a system corresponding to ISO 14064 for the CO2 omission right sales. In such an embodiment, various data obtained from three dimensional synthetic measurements such as a space satellite remote sensing by a space satellite, an under water remote sensing by a hydro-measuring device, and an artificial direct sensing, are firstly taken into a computer and are inspected precisely under comparison with the corresponding basics, which are previously filed in the computer data base, for security of the reliability, accuracy and transparency of the numbers of such calculation, and finally the CO2 omission right is induced based upon such an accurate kombu weight after weighting it closely.

In this business model, firstly a special kombu culture facilities such as a large mooring facility just same as the SAHARA MACHI type, which provides a trunk ropes of 1200 m lengthened 22 lines, is constructed multiply as shown at (A)(B) . . . in FIG. 2. And various data for the cultural and natural conditions, etc., on such a sea algae, are put into always a computer (C) to memorize and accumulate them hereto, while various records measured by a remote sensing from a space satellite (S) about the natural conditions such as numbers of cultivating kombu, water temperature, atmospheric temperature, atmospheric pressure, rainfall, and direction of tide, etc, in this area, are also input into the computer day by day. And further if it is necessary to inspect precisely those numerical values, they may be inspected minutely with three dimensional measurement system, such as the above space satellite remote sensing, an under water remote sensing and an artificial direct sensing to scan the above data about the growing kombu, and thereafter, to input into the computer for filing them in its memory portion. Thus, those filed data are compared with the same objects on the data base at the presence of the public third person, and the wet cultured kombu weight and fixed carbon quantity, are precisely calculated therefrom to decide finally the GHG omission right, according to the GHG omission right joint mechanism, as mentioned before. The decided value may also be inspected by the public third person to secure its accuracy, liability and transparency.

Figure 7A:
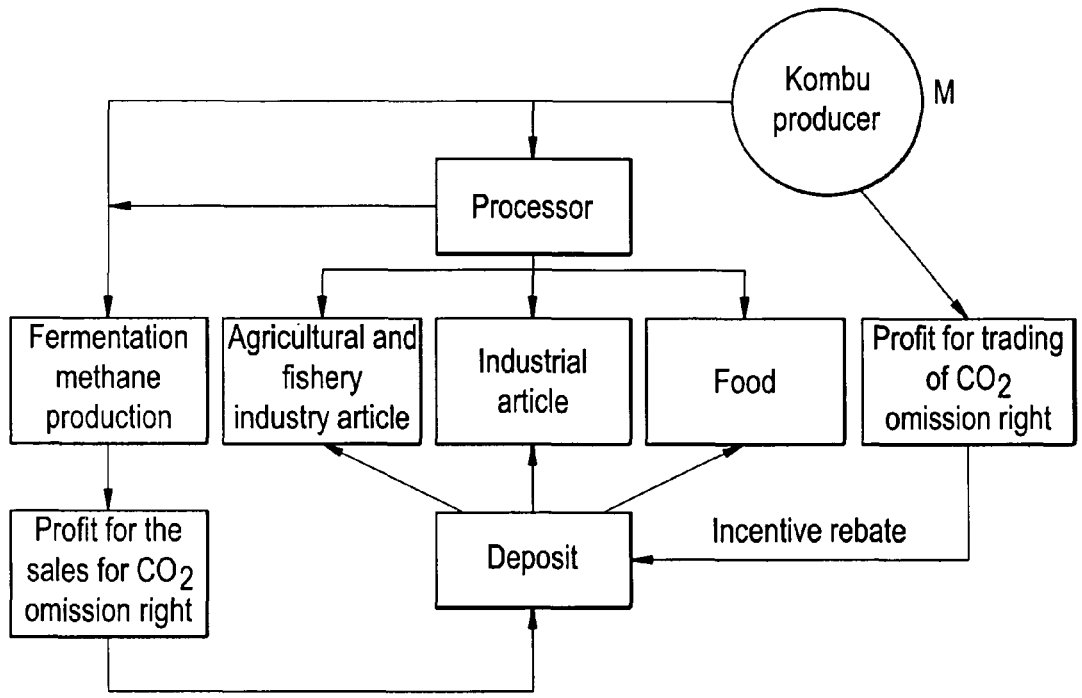
FIG. 7-A is flowchart showing how a sales profit of the $CO_2$ omission right is paid-back to each purchaser concerned as an incentive fund.
Figure 7B:
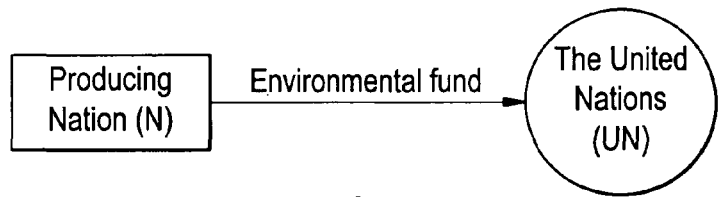

The CO2 omission right secured through such close inspection is sold for an optional contractor through a communication circuit from the GHG omission right trading center (9) connected with a cultivator computer C. However, a part of profits made by such CO2 omission right trading is refunded as shown in FIG. 7-A by the cultivator (M) to be paid-back, depending on a quantity of purchase, to a purchaser of the cultured kombu, and is put it to use as an incentive fund for activation of the cultured kombu industry, increase of the GHG reduction quantity and development of their technologies. In the other way, the fund is also used, as shown in FIG. 7-B, for the world environmental purification, global warming purification, etc., by contributing to the United Nations (U.N.) from the nation concerned, as the environmental fund Further, the kombu cultivator or its processor may manufacture methane by means of microbe fermentation from law grade article or waste of the cultured kombu, and sell it as the domestic fuel or industrial fuel for the fossil fuel. The microbe fermentation process of methane, at some time, may create a GHG omission right like the CO2 omission right because it relates to a reducing method for methane gas which is a kind of global warming gas, and its right may also be sold, in accordance with a business in FIG. 5, through the global warming gas omission right trading mechanism. The profit from such a business may also be deposited to use for a same purpose described hereinbefore. Additionally, it is also much expected in the near future that are ethyl alcohol manufacturing process, which uses the cultured kombu as a bioreactor, may contribute very much to increase usage of it and to reduce the global warming gas with the above methane fermentation technology, because the former is now almost practical.

The above mentioned cultured kombu business models referred to are merely a simple selling of the cultured kombu raw material in the primary cultivative production, a selling business for the CO2 omission right depending on the carbon fixing reaction in a course of the culture kombu production, and the methane fermentation business of the biomass product (cultured kombu) belonging to the secondary industry. However, such business models include also the other massive businesses such as a kombu processing business as shown in FIG. 1, a kombu culture technology offer business in the kombu culture industry, an offer business of the culture facility, and an offer business of the kombu merchandise production technology. Accordingly, those huge businesses shall be described below in order.

The kombu using business model (U) in the general kombu business (KB), as shown in FIG. 1, comprises a selling business of kombu raw material as a primary product, a same business of the CO2 omission right, basing upon the CO2 fixing, and an indirect business which have no any marketability, such as environmental purification, rearing the childish fish, etc. in other words, the culture kombu in the under water forms a laying eggs ground for the wandering fish, at same time a fishing ground for child care and production, and prevents a damage such as red tide by purification of the sea water. The kombu can also improve a catch haul of fish in the adjacent sea of a kombu culturing ground, and at same time also, makes a feeding ground of the fish and selfish to help their growth and to much increase the marine products, purifying such aqueous environment. Accordingly, such in direct advantages of the cultured kombu in the under water may create also, immeasurable and very important economical profits, except for the huge profit thereof.

Next, the kombu processing product of its processing business are classified in to the food (a), the industrial article (b) and the agricultural, forestry and marine article (c), etc., to explain in order, because they take up various topics.

Kombu Foods (a)

Firstly, the raw materials of the kombu, as well known, is not shipped as it is, except for in the case of a beach processing but the almost of them, shipped as an airing kombu and a curing kombu for the food article. Recently, the root kombu and stem parts of the former, especially, appears in the market as a health food, which is a higher price, and further the latter is also distributed in the health food market at a higher price, as a trade name of "Marine Salad", after its potential green color is drawn out through the boiling water, and at same time, the salting kombu, which was treated with salt to increase its preservative ability, is also distributed at low temperature.

Such material is processed for the food articles from ancient time due to a good flavor and to a higher nutritive value, and is used as the food article for the side dish foods, As much as 53 kinds, and also used as the delicious seasoning (a-1) for the flavor soup, boil down soup, and water soup, etc., and finally, it is processed again to the "Kombu tukudani", namely, "Sweet boiled kombu" which was boiled in the sweetened soy sauce together with the salt kombu, without giving up the used material, and distributed in the market with the other food articles. It is obviously to say nothing that such various usages of the kombu as the food articles are caused by the reasons that the kombu is a marine product, which is the same source material of the medicine and food, including in it many useful ingredients for the human body, such as the proteins, for example, amino acids, glutaminic acids, etc., the carbohydrates, minerals, and lipids, and so on.

Furthermore, this edible kombu is processed according to their purposes for use into the various merchandises (a-2) in FIG. 1, such as a slice kombu, vague kombu, cutkombu, seasoning kombu, kombu roll, kombu tukudani, Vinegar kombu, salt kombu, powder kombu, kombu tea, kombu cake, kombu vinegar, kombu candy, and so on, and those merchandises are distributed through the trading market respectively.

Kombu Industrial Article (b)

Conventionally, the kombu is merely used for the food articles because its output quantity of the products is very limited for its producing place, which is generally in the cold districts, and the price is always more higher. However, the kombu culture technology has succeeded to cultivate it recently, even in a warm sea area such as a subtropical zone and in a planned production, due to the remarkable technical development for the cultivation and selective breeding, and such results come to an attention recently with the various effects of the kombu, such as a fast growth ability, its important components, the diet of fish and shellfish and their rearing, the under sea environmental purification, etc. Furthermore, those results suddenly come into a limelight because the GHG omission right problem is strongly referred to socially and technically. Therefore, there is no doubt that in the near future kombu will be greatly cultivated intentionally for usage as an energy source for the fossil fuel and the GHG reduction source, as well as the global food source of the mankind, animal and living things, and that the production of the industrial articles which is incidental to those industries, is also to do so. Accordingly, an embodiment of the kombu business model for its industrial articles is described hereunder.

Alginic Acid Industry (b-1)

Ordinarily, alginic acid comprises a natural organic high molecular electrolytic material which is so called as "KOMBU ACID" and constitutes a special ingredient of the brown algae, such as the kombu, and so on. The acid, in the meantime, is widely used in the various industries such as a food industry, cosmetic industry, medicine agent, agricultural agent, fixing agent of the bioreactor, etc., because it provides various strong characters such as an increasing character for viscosity, form maintaining and colloid protection character, emulsion stability character, foam stability character, etc., due to its strong activity and hydrophilic. Firstly, the organic acid is widely used as a food additive for bread, ramen (china noodles), beer, liquor, jam, ketchup, seasoning, dairy products, etc.

While, the alginic acid is used as a diet food for prevention of corpulence, due to a functional food, and is also used as an evacuation agent and a medicine for intestinal disorder due to its fibrous and intestinal regulating action, and further used as an internal accumulation suppress agent for the radioactive materials such as cadmium, strontium etc., due to its metallic ion absorption and discharge action, and as a virus preservative agent for its virus chilling effect, also.

Furthermore, it is used for cosmetics such as a cream, lotion, shampoo, and so on, due to its high viscosity and non-sticky character, and become to be used widely as a mixture agent of water proof paste, and hard water softener, cement, mortar, and as an additional agent for paper, industrial paste, soap, dental cream, etc., in the meantime. For these reasons, it is predicted that in the future that a mass production type key industry of the paper and fiber, the same as a land fiber article, will be created by applying fibrous character of the alginic acid.

Especially, in the $21^{st}$ Century, it is predicted that an international mass production of the cultured kombu will be carried out for the GHG omission, and that a prediction industry of a fuel for the fossil fuel and above fiber industry, which may use a great deal of kombu, will happen, due to such huge amount of cultured kombu. While, it is also expected that another an other big business will is also be created because a continuous thread may be produced from sodium alginate, which can be spun into a thread, cut to produce a rayon and staple fiber thread therefrom, and used for production of a cloth or fiber. Further, sodium alginate may also be made into a paper, providing strength of a newspaper degree after its making, and may also be produced into a special cloth or a sound vibrating plate, etc. providing a water proof property or a water permeable property, in combination with the other fiber, and in the other while, it has already been utilized in a textile printing industry, as an anti printing agent, also.

Since ancient time, the kombu has been valued highly in China, as a Chinese medicine of perpetual youth and longevity, and has been used especially as a specific medicine from the kombu for goiter (Basedou's disease), which is a local disease and falls ill at a I-luck region such as in the continental interior of China. The kombu has been also widely used for a Chinese food cooking, due to its seasoning property of glutaminic acid included herein and above both usages of the kombu have brought up China into a large country which can produce it in an amount of 0.5-0.7 million tons per year in dry weight. In Japan, a root kombu from the algae such as the kombu is now utilized as a reducing agent of cholesterol value, and the kombu material itself, as an exterminating agent for round worm and an anti-oxidant of blood, also. Additionally, the kombu material is utilized as a cancer therapeutic drug in the Chinese medical science, as an alginate seal image agent in the dental science, every kinds of the drug carrier, the drug dispersant drug binders, high blood pressure therapeutic agent, styptic agent of the digestive organ, the requisite medicine for radioactive ray accident, etc., and as such results of the many applications, it may create a relatively bigger business effect in this field. Also in the agricultural field, the alginic acid of the kombu is used specifically as a pesticide agent which prevents infection from cigarette virus.

Biomass Fuel Fermentation Industry

A sea algae fermentation business model such as methane gas production in the present subjects is omitted to describe there from because it has been already disclosed in a CO2 absorption and fixation clause of the kombu use. The production of ethyl alcohol with the bioreactor of the alginic acid in the sea algae such as kombu, sargassaceae, etc., approaches to start it, day by day, and the alcohol is expected to use as a clean car fuel additive in near future.

Agricultural, Forestry and Marine Products Industry Articles (C)

Kombu Fertilizer (C-1)

Ordinary, the sea algae such as the kombu includes a many kinds of components namely minerals, carbon hydrates, proteins, etc., and has been used widely as the compost from ancient time in Europe and America because it has neither side effects of a chemical fertilizer nor influence of parasitic from worm and bacteria from the stable manure and the human feces. Further, the kombu fertilizer is also used separately as a soil manure and leaf side scatter because the former can be preferably utilized as a powder fertilizer which does not occur a repeated cultivation disorder and responds to the stable manure, and later, also preferably utilized as a safe insect cider which does not provide the side effect of the chemical medicine ingredient, and more used effectively as a insect repellent agent which can control the generation of harmful insect, because it includes an ingredients such as sulfur, sodium etc., of which the harmful insects dislike it very much. The scatter and fertilizer have a special effect for disinfection of the citrus fruits and further is utilized widely for early shipment of the weak greens such as lettuce, spinach, etc., for increasing of sugar content of tomato, water melon, and so on, and for prevention of dying of the cropped greens also.

Kombu Food (C-2)

The sea algae, especially the kombu, has not been used in Japan, from ancient time, as a domestic animal food but used in Europe and America. Kelp mil powder that is added in the rate of 2% of the feed, is recommended to use especially as an asserted feed for the domestic animal feed, for increasing of appetite and improving of the quantity of milk secretion with the quality of the meat. Therefore, it is predicted that usage of the cultured kombu in future, is also increased remarkably.

Cultured Fishery Feed (C-3)

Recently, the kombu has been cultured especially as a special bite for abalone, sea urchin, turban shell, etc., which is living on the kombu, because those sea animal cultivation come to perform actively. Especially, in the abalone cultivation, a compound culture facility for the kombu and abalone that a culture basket for later is suspended on a part of the kombu culturing facility, comes to be used actively, also.

While, a yellowtail cultivation, the kombu is mixed to use as an asserted feed for a fry, due to its kindly disease prevention, also. Accordingly, it is predicted that the kombu culturing business becomes into a good business more and more, in consideration of above consumption of the sea algae in their utilizing and processing industries, because a coast and offing culture of the fishing products are predicted also to increase still more in future for decrease of the global marine resource, due to setting of the 200 mile exclusive economical zone, indiscriminate fishing of the fish and also marine pollution.

Accompanying Business for the Kombu Culture (KD)

One of the those accompanying business for the cultured kombu for example an institution and offer business of the facility is very important because the facility can be easily changed into a military defense facility which provides an under water detector (10) and an electric transmitter (11), etc. to perceive an invader or the like, without being noticed, because the former may be set between the grow thick sea algae and the later, in a float (3) also. If a large number of the facilities may surround along a desired national shoreline, the nation may be guarded very effectively from the invader or the sudden attack of the other nation.

Further, the facility may also be utilized as a recycle means for iron slag, which is by-produced very much in iron works, by a simple improvement of a float (3), as shown in FIG. 4. The iron slag, which isolates Fe++ in the water and activates photosynthesis of chlorophyll to bring up the sea algae, is utilized as a fertilizer of the sea algae with the other effective fertilizer components such as a nitrogenous fertilizer, phosphorous fertilizer and minerals. In usage, such slag is received into an under half portion of the float (3") with the above other compounds so that the iron ion exudes and the compounds dissolve out gradually from a porous underside of the float (3) to manufacture the sea algae (8). A large mooring sea algae culturing facility (1) such as a SAHARA TYPE shown in FIG. 1, can be very usefully for recycling the slag because such a facility provides the much needed floats and can receive a remarkable quantity of the slag per one unit. The slag that accumulated on a sea bottom by dumping after the culturing, can also effectively repair the desolation of a seashore.

Figure 8:
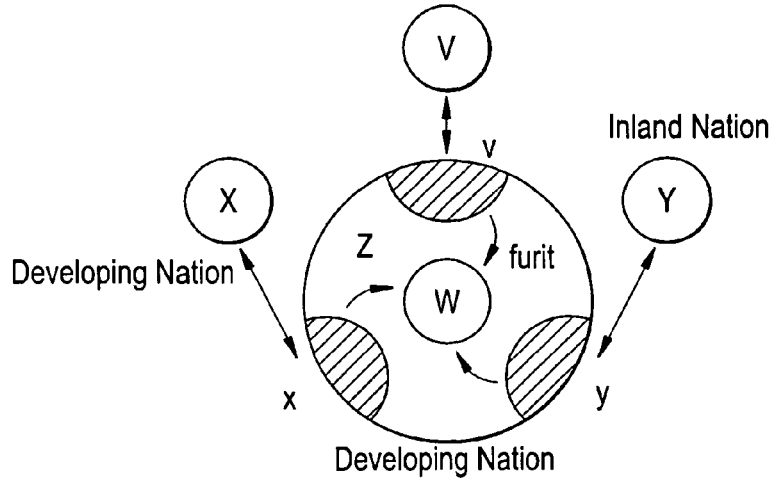
FIG. 8 is a schematic showing a relation between an advanced nation, an inland nation and a developing nation for a credit system for a business model including a $CO_2$ omission right trading.

In a global aspect, the present cultured sea algae business is very effective and useful for a marine nation because an international comprehensive credit included the CDM, JI, GHG omission right trading, and the activity for the GHG absorption, etc., may be agreed, according to "Kyoto Protocol", between an advanced nation, an inland nation and a developing nation, as shown in FIG. 8. In such credit system, a developing nation (W) in a suitable sea area, which can glow the desired object, may credit a partial zone (v) or (y) of their territorial water sea area to an advanced nation (V) or an inland nation (Y), etc. to cultivate the sea algae, which can create the business model including the CO2 omission right trading, in such a substitution ocean namely the credited partial zone (v) or (y), according to "Kyoto Protocol", and the former (W) may receives from a later a partial economical and industrial fruits created by such credit agreement to be able to activate their industry and economy thereby.

While, the later may cultivate the desired sea algae, such as the kombu, etc., to perform the above business model and sells or offers the former their culturing facility or technology, also. The other developing nation (X), which enables to cultivate the sea algae even if they have not a suitable sea zone for its cultivation, is also to do so, to obtain above all fruits from the cultured sea algae as same as the other nations (V) and (Y), if the nation has a culturing, processing and utilizing technologies for the sea algae. Thus, the credit system for the sea algae business may utilize almost ocean as a field of the sea algae to give equivalently a same economical benefit on the advanced nation and also the developing nation, and may perform each part of those nations to prevent the global warming.

Furthermore, the management of various products, etc., which are manufactured and distributed by each processing, utilizing and accompanying businesses of such cultured kombu, may also be carried out under a lump with a producer computer (C), used in the CO2 omission right trading, however, it is preferably that the products, etc., are managed in each computer of the processor, the use supplier or the distributor respectively, and a desired object is treated through a communication circuit, after registration of each password and code number of those concerned, as a member of that society, and each account may also be settled with the electro money.

An embodiment of the present invention has been described hereinabove, however, a rough estimate prediction for the economical effects in a case of production for the cultured kombu, in wet weight of 5 million tons, by a large kombu culturing facility such as Sahara bay mooring type facility, is described hereunder for a reference material of the present business model.

An economical prediction of the forcing cultured kombu business in the production volume of 5 million tons.

Rough estimation cost per one set of Sahara type large mooring facility (As a pilot type facility) . . . ¥3 hundred million Cultured kombu Yield in wet weight/one set . . . 4225 tons (Data base value by an artificial inspection per one above facility)

Numbers of sets for production of 5 million tons of the wet cultured kombu . . . 500/04225=1,131 sets Institution fee for all sets of the facilities ¥3 hundred millions×1131=¥3,393 hundred millions Amount for shipment of 5 million wet cultured kombu . . . =¥2000~3000×5 million=¥10~15 trillions (Market price for 1 Kg of wet kombu=¥2000~3000, in high quality)

CO2 omission quantity for wet kombu of 5 million tons . . . ¥2000×5 hundred thousands=¥1 billion (But: 1 ton of Dry kombu=5 tons of Wet kombu: ½ tons of CO2=1 ton of Dry kombu)

Rough estimation of processing market price for 5 million tons of the dry cultured kombu: ¥10~15 trillion×3~5=¥30~75 trillions*

(But: Processing market price of the cultured kombu=3~5 coast market price=3-5 Wet cultured kombu price)

Rough estimation for 5 million tons of the cultured kombu in the trading market*

(1) Processing market price . . . ¥30~75 trillions (2) CO2 omission right price . . . =¥1 billion (3) Total rough estimated amount for 5 million tons cultured kombu business: . . . ¥30-75 trillion+¥1 billion Additionally, the kombu cultivation may offer many indirect and unpredicted effects, together with the direct economical effects, such as marine environmental purification, a production increase of fishery products, prevention of the global warming, etc. Therefore, it is strongly convinced that such enforcement of the present business model for the forcing cultured kombu is not only supplying luck of the global food but also is an indispensable final means, which may help the earth it self, because it may be the sole means remaining in the future to prevent naturally global warming and may also be an effective means for further activation of the global land economy.

In addition, while an embodiment of the invention has been described with reference to exemplary embodiments, it will be understood by those skilled in the art that various changes may be made in the function and/or way and/or result and equivalents may be substituted for elements thereof without departing from the scope and extent of the invention. In addition, many modifications may be made to adapt a particular situation or material to the teachings of the invention without departing from the essential scope thereof. Therefore, it is intended that the invention not be limited to a particular embodiment disclosed for carrying out this invention, but that the invention will include all embodiments falling within the scope of the appended claims. Moreover, the use of the terms first, second, etc. or steps do not denote any order or importance, but rather the terms first, second, etc. or steps are used to distinguish one element or feature from another. Furthermore, the use of the terms a, an, etc. do not denote a limitation of quantity, but rather denote the presence of at least one of the referenced element or feature.

The invention claimed is:

1. A method for cultured algae comprising:
   storing, in a computer data base, records of culturing conditions, yield, and carbon fixation volumes for a sea algae culturing facility of a predetermined scale in a specific sea area;
   obtaining, via a remote sensing device configured to perform at least one of space satellite remote sensing, under water remote sensing, and direct artificial sensing, data pertaining to actual culturing conditions, yield, and carbon fixation volumes associated with the sea algae culturing facility;
   storing, in a computer data base, the data obtained pertaining to the actual culturing conditions, yield, and carbon fixation volumes;
   comparing the obtained data pertaining to the actual culturing conditions, yield, and carbon fixation volumes to the stored records of culturing conditions, yield and carbon fixation volumes of the sea algae culturing facility;
   computing a weight of cultured sea algae and a carbon fixation quantity from the obtained data and certifying the computed carbon fixation quantity in the presence of a third party;
   calculating a greenhouse gas omission right based on the certified carbon fixation quantity and the computed weight of the cultured sea algae;
   selling the greenhouse gas omission right through a global warming gas omission right trading mechanism;
   processing at least a portion of the cultured sea algae to produce a product, the product including at least one of a food article, an industrial article, and an agriculture-forestry-marine article; and
   distributing, via a market, the product produced from processing at least a portion of the cultured sea algae.

2. The method according to claim 1 wherein the cultured sea algae is brown algae or green algae or red algae or the kombu.

3. The method according to claim 2 wherein the multiple dimensional remote sensing systems is respectively a system corresponding to a provision of ISO 14604.

4. The method according to claim 2 wherein a constant rate of money is paid back to a purchaser of the cultured sea algae.

5. The method according to claim 1 wherein the multiple dimensional remote sensing systems is respectively a system corresponding to a provision of ISO 14064.

6. The method according to claim 5 wherein a constant rate of money is paid back to a purchaser of the cultured sea algae.

7. The method according to claim 6 wherein the sea algae culturing facility provides at least one kind of an under water detector or sensor or an electric transmitter.

8. The method according to claim 1 wherein a constant rate of money is paid back to a purchaser of the cultured sea algae.

9. The method according to claim 1 wherein the method includes the sales of sea algae culturing technologies.

10. The method according to claim 1 wherein a product from the sea algae includes methane gas or ethyl alcohol and the greenhouse gas omission right is sold through a communication circuit or an ordinary trading center.

11. The method according to claim 1 wherein the sea algae culturing facility is a large bay mooring type or a large offing and up and down type facility.

12. The method according to claim 11 wherein the sea algae culturing facility provides a mechanism configured for scattering iron slag and dissolving out fertilizer into the under sea to grow the culturing sea algae.

13. The method according to claim 1 wherein the sea algae culturing facility provides at least one kind of an under water detector or sensor or an electric transmitter.

14. The method according to claim 13 wherein the sea algae culturing facility provides a mechanism configured for scattering iron slag and dissolving out fertilizer into the under sea to grow the culturing sea algae.

15. The method according to claim 1 wherein the sea algae culturing facility provides a mechanism configured for scattering iron slag and dissolving out fertilizer into the under sea to grow the culturing sea algae.

16. The method according to claim 15 wherein the mechanism configured for scattering the iron slag and dissolving out fertilizer is a float which receives the slag and fertilizer in a porous under half portion of the float or a bag of mesh or cloth hung down on a floating trunk rope of the sea algae culturing facility.

17. The method according to claim 1 wherein a desired sea algae is cultivated by one nation in a proper sea area for cultivation which is credited from other nation, under an international comprehensive credit agreement according to Kyoto Protocol, to obtain a mutual profit from the cultured sea algae respectively.

18. The method according to claim 17 wherein the one nation credited a proper sea zone to cultivate a desired object from another marine nation, is an inland nation.

19. A method for cultured sea algae comprising:
storing in a computer database first records of culturing conditions, yield and carbon fixation volumes for a sea algae culturing facility of a predetermined scale in a specific sea area;
performing, by a remote sensing device, a multidimensional inspection of the sea algae facility to obtain actual data, the actual data including culturing conditions, yield and carbon fixation volumes;
storing in the computer data base the obtained actual data;
comparing the first records and the obtained actual data;
computing a weight of cultured sea algae and a carbon fixation quantity;
certifying the computed weight and the carbon fixation quantity in the presence of a third party;
selling a greenhouse gas omission right through a greenhouse gas omission right trading market, the greenhouse gas omission right based on the certified carbon fixation quantity and the computed weight;
processing at least a portion of the cultured sea algae to produce at least one product;
distributing, via a market, the at least one product produced from processing at least a portion of the cultured sea algae.

20. The method according to claim 19 wherein the cultured sea algae is brown algae or green algae or red algae.

21. The method according to claim 20 wherein the cultured sea algae is kombu.

22. The method according to claim 19 wherein the remote sensing device utilizes at least one of space satellite remote sensing, under water remote sensing, or direct artificial sensing.

23. The method according to claim 22 wherein the multidimensional inspection employs a system corresponding to a provision of ISO 14604.

* * * * *